May 22, 1962
W. H. PETERSON
3,035,827
LONG TRAVEL HYDRAULIC CUSHION DEVICE
Filed Dec. 24, 1958
3 Sheets-Sheet 1
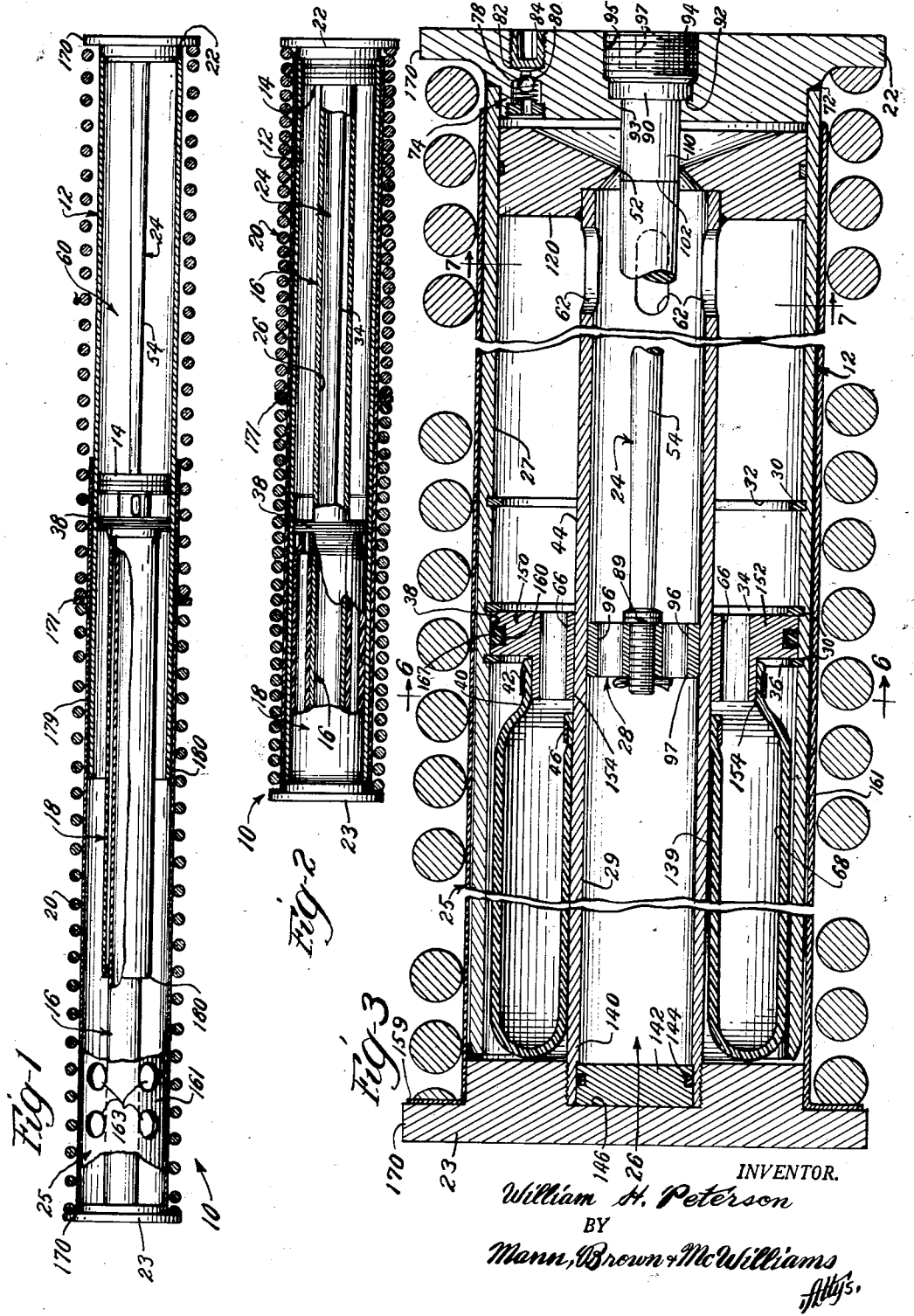
INVENTOR.
William H. Peterson
BY
Mann, Brown & McWilliams
Attys.

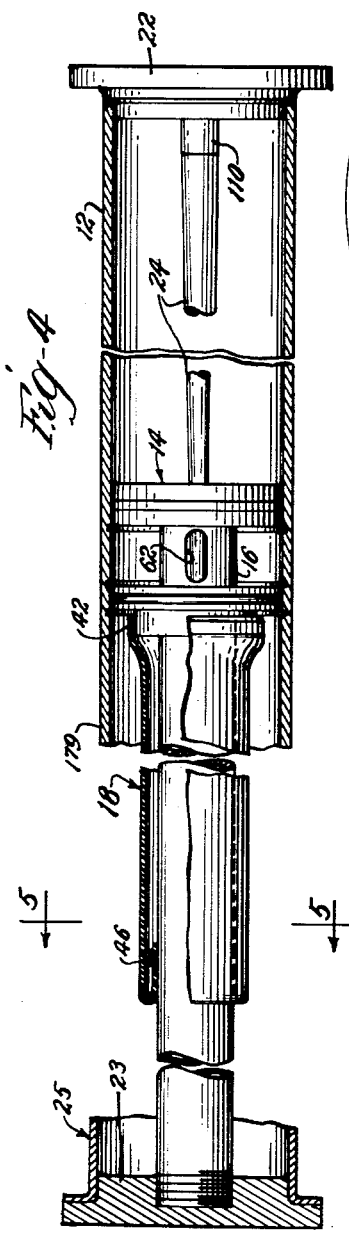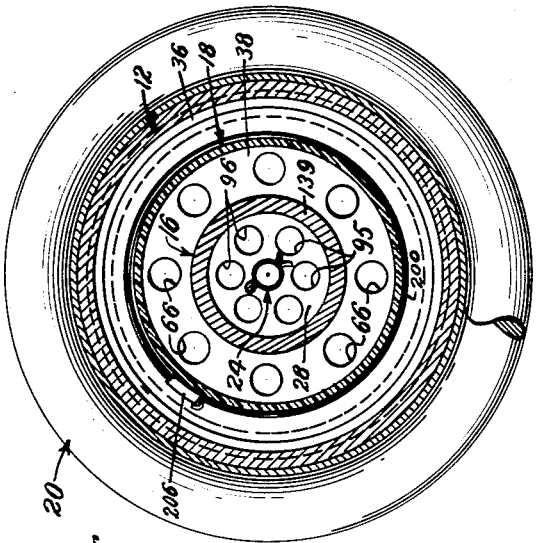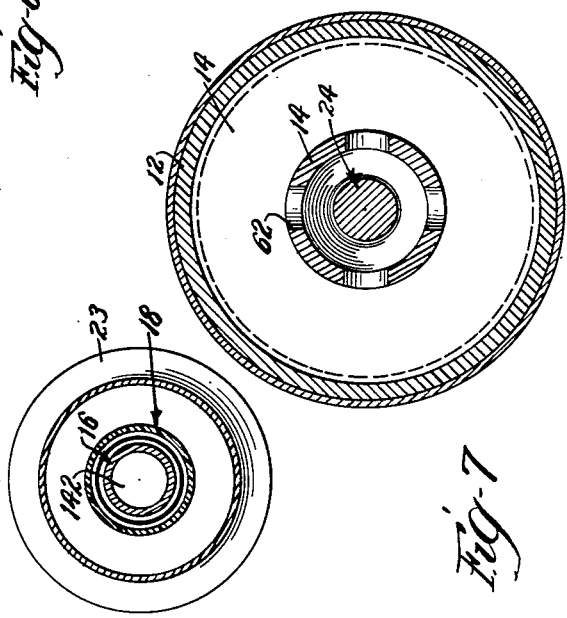

May 22, 1962  W. H. PETERSON  3,035,827
LONG TRAVEL HYDRAULIC CUSHION DEVICE
Filed Dec. 24, 1958  3 Sheets-Sheet 3
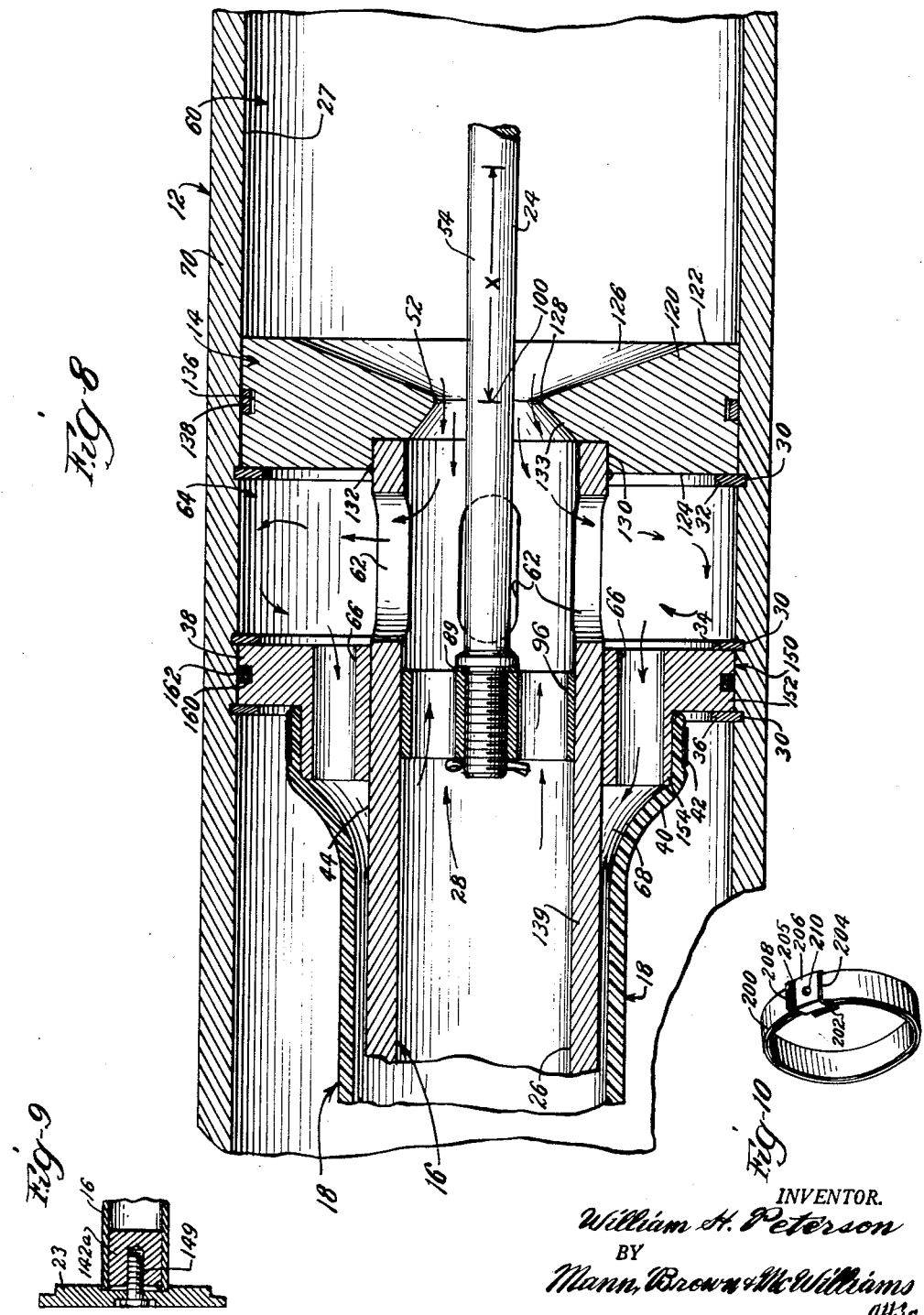
INVENTOR.
William H. Peterson
BY
Mann, Brown & McWilliams
Attys.

United States Patent Office 3,035,827
Patented May 22, 1962

3,035,827
LONG TRAVEL HYDRAULIC CUSHION DEVICE
William H. Peterson, Homewood, Ill., assignor to Pullman, Incorporated, Chicago, Ill., a corporation of Delaware
Filed Dec. 24, 1958, Ser. No. 782,786
3 Claims. (Cl. 267—34)

My invention relates to a hydraulic cushion device, and more particularly, to a hydraulic cushion device that is capable of providing a cushioning action over a distance on the order of 30 inches, or any other desired travel.

Hydraulic cushioning devices customarily include two relatively movable parts initially separated by a body of hydraulic liquid, at least one of which, when a shock to be cushioned is applied to the device, is directed against the hydraulic liquid to force it through relatively small orifices whereby the kinetic energy of the shock is dissipated in the form of heat.

These devices in the past have relied on sliding or dynamic seals to provide the sealing action necessary, which require precise manufacturing tolerances to form, and constant maintenance to insure their continued effectiveness.

Furthermore, the sliding or dynamic seals have often been located where the hydraulic pressure or flow velocity is the greatest during the cushioning action, which inevitably results in some leakage regardless of the efficiency of the sliding seal employed and caliber of maintenance provided.

A principal object of my invention is to provide a hydraulic cushioning device which eliminates sliding or dynamic seals at the point where the piston rod enters the hydraulic chamber in favor of static or stationary seals, and in which the static seals are positioned away from high pressure areas in the device.

A further object of the invention is to provide a long travel cushioning device having a substantially constant force-travel characteristic in absorbing shock.

Other objects of the invention are to provide a hydraulic cushioning device which is composed of few and simple parts; which avoids the expensive manufacturing operations and maintenance practices normally required of sliding seal type cushioning devices; which eliminates metal to metal contact on bottoming of the device in its fully retracted position; which is hermetically sealed against hydraulic liquid leakage and entry of ambient air; and which is readily adapted for a wide variety of cushioning applications.

Further objects, uses and advantages will become obvious or be apparent from a consideration of the following detailed description and the application drawings.

In the drawings:

FIGURE 1 is a small scale diagrammatic plan view of a preferred embodiment of the invention, shown in its fully extended position, parts being shown in section;

FIGURE 2 is similar to that of FIGURE 1 but showing the device in its fully retracted position;

FIGURE 3 is a showing of the cushion device as positioned in FIGURE 2 on an enlarged scale, with parts broken away to facilitate illustration;

FIGURE 4 is a view of the cushion device as positioned in FIGURE 1 but on an enlarged scale and with parts broken away to faciltate illustration;

FIGURE 5 is a cross-sectional view along line 5—5 of FIGURE 4;

FIGURE 6 is a cross-sectional view along line 6—6 of FIGURE 3;

FIGURE 7 is a cross-sectional view along line 7—7 of FIGURE 3;

FIGURE 8 is a fragmental cross-sectional view through the central portion of the cushioning device as it is shown in FIGURE 1, on an enlarged scale;

FIGURE 9 is a fragmental cross-sectional view illustrating an alternate way of fixing the tubular piston rod to its closure member; and FIGURE 10 is a perspective view illustrating a hose clamp of a type suitable for use in my invention.

*General Description*

Reference numeral 10 of FIGURES 1 and 2, generally indicates a preferred embodiment of my invention which generally comprises a tubular cylinder 12 in which a piston head 14 is reciprocably mounted, a tubular piston rod 16 fixed to the piston head 14, and invaginating tubular member or boot 18 connected between the tubular cylinder 12 and the tubular piston rod 16, helical compression springs 20 extending between closure members 22 and 23 of tubular cylinder 12 and tubular piston rod 16, respectively, and a tubular guide member 25 for guiding the piston movement and the contraction and extension of springs 20.

The closure member 22 of tubular cylinder 12 carries a metering pin 24 that is reciprocably received within the bore 26 of the tubular piston rod 16. The metering pin 24 preferably is provided with a guide member 28 (see FIGURE 3) at its projecting end.

The internal surface 27 of tubular cylinder 12 is formed in any suitable manner as at 30 to receive three snap rings 32, 34 and 36. The snap ring 32 serves as a stop for piston head 14 when the device is in its extended position of FIGURE 1, while the snap rings 34 and 36 hold in place within the cylinders a piston rod guide, or annularly shaped, member 38 to which one end 40 of the invaginating boot or tubular member 18 is secured by a suitable clamp 42. The other end of boot 18 is turned outside in, and is secured to the external surface 44 of the piston rod 16 by a suitable clamp 46.

The device 10 is charged with hydraulic liquid to completely fill the space defined by the tubular cylinder 12, the tubular piston rod 16 and the invaginating boot 18. When the device is in use, as when employed as a cushion unit for a cushion underframe of a railroad car, the normal positioning of the device components is that shown in FIGURES 1 and 8, the device being mounted between suitable abutments (not shown) of the car cushion pocket, as is customary in this art. When the cushion underframe receives a shock in either buff or draft, either the tubular cylinder 12 will commence movement to the left of FIGURE 1 or the tubular piston rod 16 and piston head 14 will commence movement to the right of FIGURE 1, or possibly both movements may occur. In any event, as the device 10 retracts under the force being cushioned, the metering pin 24 displaces hydraulic liquid contained within the tubular piston rod 16 and the piston head 14 causes a hydraulic liquid flow through its orifice 52 through which the metering pin 24 extends. The metering pin is preferably provided with a tapered surface 54 that is designed to provide a constant force travel characteristic as the hydraulic cushion contracts under the shock imposed upon it; that is, the arrangement is preferably such that for every unit of travel, the cushioning device provides a substantially constant cushioning effect.

As best shown in FIGURE 8, the oil flow then initiated is from chamber 60 on the high pressure side of piston head 14 through orifice 52 and into the bore 26 of tubular piston rod 16, thence radially outwardly of the piston rod 16 through orifices or ports 62 of the tubular piston rod. As the hydraulic liquid within the tubular piston rod is displaced by the metering pin 24, it likewise moves through ports 62, as indicated by the arrows.

The hydraulic liquid flow through ports 62 is under relatively high velocity and creates great turbulence in the chamber 64 that is formed by the space between tubular piston guide member 38 and piston head 14. This great turbulence is caused at least in part by the radially directed flow of hydraulic liquid impinging directly against the inner surface 27 of tubular cylinder 12, and is responsible for dissipation of much of the kinetic energy of the hydraulic liquid in the form of heat.

As the contraction of the cushion device 10 proceeds, the high pressure chamber 60 is reduced in volume by the advancement of the piston head 14 toward the tubular cylinder closure member 22. The hydraulic liquid passing through orifice 52 fills the chamber 64 behind the piston head 14, while a volume of hydraulic liquid equivalent to that displaced by the total entry into the fluid chamber of the piston rod 16, passes through apertures 66 of guide member 38 into the space 68 enclosed by the invaginating boot or tubular member 18 which inflates or expands and rolls to the position suggested by FIGURES 2 and 3. The apertures 66, as seen in FIGURE 6, are relatively large in cross-sectional area, which provides or permits a relatively large volume and consequently low pressure hydraulic liquid flow from chamber 64 to space 68. This avoids generation of any appreciable compressive force on the relatively slender metering pin and prevents any possibility of it buckling.

After the shock has been fully dissipated, compression springs 20, acting in tandem, return the hydraulic cushion components to the initial extended position of FIGURE 1. During this movement under the action of the compression springs, the oil flow illustrated in FIGURE 8 is reversed, and invaginating tubular member or boot 18 deflates and returns to the position of FIGURE 1, thereby insuring that the hydraulic liquid displaced by the piston rod 16 is restored to its normal operative locations.

It will thus be seen that not only is the device 10 composed of few and simple components, and that all sliding or dynamic seals have been eliminated, but a reliable long travel cushioning action is provided. Furthermore all kinetic energy applied to the cushion device is transferred or dissipated in the form of heat (depending on the use to which the device is put) by the passing of the hydraulic liquid through orifice 52 and the turbulence in chamber 64, with the exception of the small potential energy stored in the return springs.

*Specific Description*

The tubular member 12 may be formed from any suitable material, such as cold drawn A.I.S.I. 1025 steel tubing having a minimum yield point of 70,000 p.s.i., the recesses 30 being formed in any suitable manner such as by lathe cutting in the internal surface 27. Internal surface 27 need only be sufficiently smooth to permit efficient operation of piston head 14, and the smoothness may be, and preferably is, comparable with (i.e. substantially equivalent to) that ordinarily obtained by drawing tubing over a polished mandrel (which results in a total tolerance variation on the order of .035 inch for an 8 inch I.D. size tube). In the form illustrated, the tubular member 12 comprises tube 70 welded as at 72 to closure plate 22, the latter forming the base plate of tubular cylinder 12. Closure plate 22 is provided with a suitable form of check valve generally indicated at 74 (see FIGURE 3) through which the hydraulic liquid passes when the device 10 is charged. Check valve 74 may include compression spring 76 acting on ball 78 to press same against valve seat 80 about inlet passage 82. Passage 82 is closed by a suitable sealing plug 84, thereby providing a final positive seal when device is in operation in the event that the check valve may not provide a definite seal under the high pressures existing during an operative stroke.

Snap ring 32 is spaced from snap ring 34 a sufficient distance to insure that piston rod ports 62 remain uncovered at all times.

The metering pin 24 is screw-threaded at its tip to receive cylindrical guide 28, which may be held in place by any suitable type of locking device, as for instance, a suitable form of lock washer located where indicated by reference numeral 89. The metering pin is applied to closure plate 22 before the cylindrical guide 28 is secured in place, pin 24 including head portion 90 that is held against annular shoulder 92 of closure plate 22 by its screw-threaded plug end 94 being turned into tapped recess 95. Copper washers may be used here as well as in sealing plug 84 to insure against leakage, and metering pin end 94 may be formed with spaced recesses 97 for cooperation with a suitable turning tool.

The guide member 28 as illustrated comprises a cylindrical brass (though any other suitable material may be employed) body 97 proportioned to slidably engage internal surface 29 of piston rod 16, and is formed with a plurality (six in the illustration of FIGURE 6) of relatively large apertures 96 to permit a free flow of hydraulic liquid during movement of the metering pin relative to the tubular piston rod. Apertures 96 should be sufficient in number and size to offer minimum resistance to the hydraulic liquid while retaining sufficient metal to give structural support. As no sealing action is required between guide member 28 and surface 29 of piston rod 16, the surface 29 need not be machined.

The tapering surface 54 of the metering pin extends between points 100 and 102 (see FIGURES 3 and 8). The contour of tapered surface 54 in the illustrated embodiment, is designed from the relationship $$A_x = A_0 \sqrt{1 - \frac{x}{d}}$$

wherein $A_x$ is the orifice area of any position $x$ (see FIGURE 8) over the total nominal stroke $d$ (the length of the tapered surface 54), and $A_0$ is the initial orifice area defined by orifice 52 at the beginning of a stroke, in the case where a completely rigid body is being cushioned from impact. While in most cases this assumption will result in a reasonably efficient design, small alterations can be readily made to this shape to give a closer approach to the optimum constant force travel characteristic for a given situation after a few experimental trials. However, the shape given by the above formula is the best starting point. Furthermore, it is usually possible to obtain a reasonably efficient design by approximating the curved shape given by the above expression as by calculating a series of spaced cross-sectional areas of the pin 24 and connecting the cross-sectional areas so determined by straight tapers, if this facilitates manufacture. The orifice areas referred to are the orifice areas of orifice 52 minus the cross-sectional area of the metering pin at any given position along the stroke of the metering pin.

The metering pin 24 between point 102 and the head portion 90 is formed with a cylindrical surface 110 having a diameter that is substantially the same as the diameter of piston head orifice 52. The arrangement is such that the tapered surface 54 ends in surface 110 before piston head 14 contacts closure plate 22. Since the surface 110 substantially closes the piston head orifice 52, some hydraulic liquid will tend to be trapped between the piston head and closure plate 22, except for leakage flow between the piston head and cylinder wall. In a specific embodiment of the invention, the piston head is spaced on the order of ½ inch from closure plate 22 when orifice 52 is closed by surface 110.

My invention contemplates the use of any suitable liquid medium that will not corrode or otherwise attack the various components of the unit, and will be in liquid form at ordinary temperatures. However, I prefer to use the high viscosity index oil sold by Shell Oil Company under the trade designation Aeroshell No. 4 as this oil desirably has a relatively small variation in viscosity between the extremes of minus 60 degrees F. and 150 degrees F., maintaining a fluid condition at the low temperature instead of becoming too viscous to flow.

The tubular cylinder 12 and tubular piston rod 16 are preferably proportioned in relative lengths to permit the piston head to move the full length of cylindrical surface 110, should this movement be necessary.

Closure plate 22 may be formed from A.I.S.I. 4140 steel which has characteristics more compatible with the high strength weld metal used in welding same to cylinder 12 and the increased strength available in the cold drawn tubing. The metering pin may be formed from any mild free machining steel.

Piston head 14, which may be formed from relatively hard A.I.S.I. 4140 steel, in the illustrated embodiment, comprises the disc-like body 120 (see FIGURE 8) formed with planar forward face 122 and planar rearward face 124. The planar face 122 merges into conical feed surface 126 that terminates in rim 128 which defines the perimeter of the piston head orifice 52. The piston head 14 is formed with recess 130 to receive the extreme end of the tubular piston rod, the two being welded together as at 132. Recess 130 merges into a conical feed surface 133 which directs hydraulic liquid to orifice 52 on extension of device 10. The rim 128 of piston head 14 in practice assumes the form of a cylindrical surface on the order of $\frac{1}{16}$ of an inch in length (lengthwise of the metering pin 24).

The piston head 14 may be formed with an annular recess 136 to receive a conventional type piston ring 138, which may be eliminated where close tolerances are employed.

Tubular piston rod 16, which may be formed from A.I.S.I. 4140 steel and, after all machining is completed and the piston head welded thereto, heat treated to the desired yield strength, in the illustrated embodiment is in the form of tube 139 having ports 62 formed therein in any suitable manner. The ports 62 are four in number in the illustrated arrangement, and are in the form of elongated holes of substantial size. The elongated form of ports 62 provides a maximum of discharge port area, with corresponding reduction in back pressure effects, while keeping the piston rod of sufficient cross section in the area of ports 62 to resist the compressive forces developed in the piston rod.

Closure 23 may be formed from mild steel.

The outwardly projecting end 140 (see FIGURE 3) of the tubular piston rod 16 may receive a sealing disc 142 provided with an O-ring seal 144; in this embodiment, end 140 of the piston rod 14 is screw threadedly received in tapped recess 146 formed in the closure plate 23. Alternately, as shown in FIGURE 9, plug 142a may be welded within rod 16 and closure 23 fixed to plug 142a by appropriate bolt 149; of course, a complete hydraulic liquid seal should be effected between plug 142a and piston rod 16.

The tubular piston rod guide member 38, which may be formed from open hearth mild steel, comprises a hub-like element 150 including a flange portion 152 that is received between snap rings 34 and 36, and annular shoulder 154 to which the end 40 of the invaginating tubular member 18 is secured. As indicated in FIGURE 6, the apertures 66 of guide member 38 are relatively large and are more or less equally distributed about this member. The hub-like member 150 may be formed with an appropriate recess 160 to receive a conventional O-ring seal 162.

The piston and return spring guide member 25 may be formed from any suitable material such as mild steel tubing drawn to telescope over cylinder 12 with a loose sliding fit and is secured in place by having its flange 159 interposed between closure plate 23 and the end of a spring 20. Tubular guide member 25 prevents jackknifing of the unit 10 and its springs 20 and may comprise tube 161 that is proportioned substantially as indicated in FIGURE 1 to fit between cylinder 12 and springs 20; tube 161 is formed with a plurality of perforations 163 to prevent entrapment of air and to provide for expelling of foreign matter on contraction of the device. Member 25 may be eliminated where device 10 is to be employed in a laterally confining housing, since the housing will provide the guiding action desired; an example of such a use is as a cushion device for a cushion underframe railroad car wherein the cushion device is applied within the confines of a conventional "Z–26" section car center sill, the structural features of which are well known in the railroad art.

The invaginating boot or tubular member 18 may be formed from any conventional substance that will resist the hydraulic liquid employed in unit 10, neoprene-Buna N type of rubber with special additives for low temperature flexibility being preferred for the hydraulic liquid mentioned above. In a specific embodiment of the invention, neoprene-Buna N (as above mentioned) tubing $\frac{3}{16}$ inch thick is employed.

The clamps 42 and 46 may be of any suitable type, though the form of clamp sold under the trademark "Punch-Lok" is preferred as it lies substantially flush against the surface of the boot 18. These clamps are available from the Punch-Lok Company of Chicago, Illinois, and as shown in FIGURE 10, comprise a stiff metallic strip 200 having one of its ends hooked as at 202 to engage one edge 204 of looped band member 206, the strip being wound on itself several times through said band member. In this condition it is applied to one end of boot 18, after which the free end of the strip 200 is pulled to tighten the band about the boot and then is bent over the other edge 205 of the band member and is trimmed off, as indicated at 208. The band member 206 and the passes of strip 200 passing through it are locked together by forming indentation 210, after the strip 200 has been pulled tight about boot 18.

The compression springs 20 may be formed from A.I.S.I. C–1095 spring steel, heat treated, or any other suitable substance that will serve the purpose, and may be in the form of a single unit or two compression springs acting in tandem, though in the latter case (and where guide 25 is not employed) the spring extending over tubular piston rod 16 should be of sufficient length to engage over the end of tubular cylinder 12 when the device 10 is in its extended position.

The unit 10 should be designed for the maximum impact and energy absorption requirements that any cushioning system in which the device is to be incorporated will be subjected to. Thus, the unit should be designed so that when the metering pin surface 110 closes piston orifice 52, the device will have absorbed the maximum impact that can be applied to the cushioning system.

In a specific embodiment of the invention, the illustrated components are proportioned to provide an extended length of 91½ inches (at which position piston head 14 bears against snap ring 52) and a compressed or a maximum retracted length of 61½ inches (at which position piston head 14 is spaced ½ inch from closure plate 22 and orifice 52 is closed by metering pin surface 110); the unit has a maximum outside diameter of 12⅝ inches as measured by the flanges 170 of the closure members 22 and 23 and the cylinder 12 has an 8½ inch diameter bore. In the illustrated embodiment, the springs 20 comprise two spring units acting in tandem between the flanges 170 of said closure members and abutting against annular seat 171 at the midpoint of the unit; each spring 20 is formed from a bar approximately 50 feet in length. The maximum outside diameter of this specific embodiment is dimensioned to fit inside of a standard freight car Z–26 section center sill member.

After the unit 10 has been assembled except for the application of the sealing plug 94 that secures the metering pin 24 in place, the unit may be charged by standing it upright so that closure member 22 is uppermost and then, with the metering pin 24 partially lifted out of opening 93 to permit air to escape, filling the device with hydraulic liquid through check valve 74 (assuming that plug 84 has been removed). The metering pin is then screwed into place and further hydraulic liquid is applied to the unit to slightly inflate the invaginating boot 18 to move it away from the tubular piston rod and thereby insure its proper rolling action on the rod. After working the cylinder 12 up and down a few times, any entrapped air will rise to the check valve 74 where it may be bled out. Then an additional charge of fluid is introduced through the check valve to make up for the air volume that has been bled from the unit, and to slightly inflate the invaginating boot so that clamp 46 will not rub in the initial part of the stroke.

The hydraulic liquid when the device is in fully extended position is under very little pressure, perhaps no more than 2 p.s.i., but even though the pressures in the high pressure chamber 60 may rise to as much as 8,000 p.s.i., as when the device 10 is employed in railroad cars to cushion buff and draft forces, the maximum pressure within the invaginating boot 18 (when fully inflated) is believed to be about 6 p.s.i. Boot 18 stretches about 100 percent when fully inflated. Units 10 can be designed for operating pressures up to the limit of the yield strength of cylinder 12, and the device illustrated when employed in a cushion underframe is capable of absorbing kinetic energy on the order of 1,000,000 foot pounds, depending, of course, on the specific design required for a specific purpose. Units 10 will thus easily absorb 15 m.p.h. impacts when applied to, for instance, a railroad cushion underframe.

*Advantages of Invention*

It will therefore be seen that I have provided a simplified and highly efficient hydraulic cushion device that is especially adapted for long travel cushioning applications.

It will be noted that the seals provided by the clamps 42 and 46 and by O-rings 162 and 144 are of the static type, as are the seals at the closure members 22 and 23. Therefore, the need for machined surfaces is eliminated. The sealing action between piston head 14 and the internal surface of the tubular cylinder 12 need only be sufficient to insure the cushioning action required since a small amount of leakage has no significant adverse effects. Furthermore, the seal provided by clamps 42 and 46 and seals 144 and 162 are located at portions of device 10 that are not exposed to high pressures.

An important aspect of my invention is that the sealing action about the piston head 14 is effected principally by the viscosity of the hydraulic liquid employed. For instance, in a further specific but somewhat smaller embodiment of the invention, an average clearance of about .005 inch exists about the piston and its piston ring in a cylinder 12 having a 5½ inch diameter bore which gives a leakage area of about .086 square inch about the piston head (the piston ring being omitted in this embodiment). The initial orifice area defined by orifice 52 for this embodiment being on the order of .649 square inch, the leakage area is thus about 13 percent of this, and as the stroke continues, this percentage increases due to the decreasing orifice area. However, the viscosity of the hydraulic liquid effects a sufficient sealing action around the piston head to be adequate for the purposes of my invention. If leakage about the piston head becomes excessive, this may be remedied by making the piston of greater dimensions longitudinally of the cylinder 12, so as to increase the length of the flow path and resistance to leakage. When hydraulic liquid of the type above specified is to be employed, a piston head thickness of about 1½ inches is satisfactory for the specific embodiments referred to, but the actual piston thickness for any specific design will depend on such factors as the viscosity of the hydraulic liquid employed, the tolerances to be followed, and the pressure range that the device is to operate in.

While it is important that the viscosity of the hydraulic liquid employed remain substantially constant over a reasonable temperature range, the effect of viscosity changes in device 10 is minimized by the relatively short passage defined by rim 128 that forms orifice 52. The reason for this is that the effect of viscosity variations is a direct function of the length of the passage through which the hydraulic liquid flows.

Successful tests made on a cushion unit having the piston head fits described immediately above involved the use of a tube for cylinder 12 just as it was purchased from the manufacturer, with no machining of the inside surface 27, except for the formation of grooves 30. The cost savings obtained by avoiding the necessity for precision more than compensate for any small reductions in potential efficiency.

The oil leakage past piston head 14 because of tolerance variations actually serves an important function in my invention. As shown in FIGURE 3, the orifice 52 should close rapidly near the end of the contraction stroke since if the constant force travel characteristic is to be maintained to as near the stroke end as possible, the reduction in oil flow must correspond to the drop in the velocity of the piston head 14 as it approaches zero. If the piston head continues to move on closure of orifice 52, the oil flow around piston head 14 prevents a sudden peaking of the cushioning forces at the stroke end.

Since the unit 10 is designed so that the maximum impact to be absorbed will have been absorbed when the orifice 52 closes, the piston head will be spaced from closure 22 when the device is in its fully retracted position. This prevents the piston head from bottoming against closure plate 22 and the leakage about the piston head still permits the device to close further if need be, as limited by the length of metering pin surfaces 110. The length of the surfaces in the above mentioned specific embodiments is ½ inch, which was settled on after experimentation indicated the need for a spacing, in that range, of the piston head from closure 22 in the fully retracted position.

The portion 179 of the tubular cylinder 12 extending between guide member 38 and its end 180 forms a protective extension over the end 40 of invaginating boot 18 and its connection with guide member 38 as does guide 161. Extension 179 may be formed with perforations (not shown) that serve the same purpose as perforations 163.

As the invaginating boot or tubular member 18 fills with hydraulic liquid displaced by the entry of the piston rod into the hydraulic cylinder and the entry of the metering pin 24 into the bore of the piston rod 16, it expands somewhat and applies some pressure to the hydraulic liquid, which, as well as outside atmospheric pressure on the rubber boot, insures its return through the guide member 38 and then, through orifice 52 to the high pressure side of the piston on return of the unit to its extended position. The expansibility of boot 18 avoids any large build up of back pressure that would interfere with the operating characteristics of the device. As the unit moves between extended and contracted positions, the boot 18 rolls along the external surface of the tubular piston rod and thus is fully operative regardless of the nature of this external surface. The flexibility of the rubber boot also compensates for temperature expansion and contraction of the volume of fluid.

The external and internal surfaces of the tubular piston rod need only be a standard rough finish since the guiding actions provided by the guide members 28 and 38 do not require highly polished surfaces. The guide member 28 effectively prevents vibration and chattering of the metering pin and this not only protects the metering pin itself from fatigue, but also protects the orifice 52 from deformation.

On contraction of the unit in absorbing shock, the high pressure hydraulic flow is confined within the turbulence chamber 64, the hydraulic liquid flow through aperture 66 being of relatively low velocity because the kinetic energy of the hydraulic liquid has been partially dissipated in the turbulence chamber. Furthermore, the hydraulic liquid flow from apertures 66 is longitudinally of the invaginating member 18, which avoids to a large extent, the impinging of high velocity hydraulic flow against the material forming the invaginating member, thereby avoiding excessive wear or deterioration on this member. It may be added that the action of the hydraulic liquid in flowing through orifice 52 and into turbulence chamber 64 dissipates in the form of heat substantially all of the kinetic energy imposed on device 10 when the device 10 is interposed between fixed and movable abutments.

The total port area defined by ports 62 should be substantially greater than the orifice area defined by orifice 52 and the metering pin 24. I have found that in practice that ports 62 should define an area that is four times the initial effective orifice area provided by orifice 52; while this does not appear to be too critical, it is desirable that there be an excess discharge area from the tubular piston rod to prevent ports 62 from significantly influencing the constant force characteristic provided by metering pin 24 in operation with orifice 52.

As has already been noted, the discharge from ports 62 is laterally of the piston rod, which is highly effective in creating a turbulence that will effectively convert the kinetic energy of the hydraulic liquid into heat. This is done while permitting a low velocity hydraulic liquid discharge into the invaginating boot 18.

The unit 10 does not require check valves other than valve 74 and need not necessarily be round in cross-sectional configuration, though from a manufacturing standpoint, this shape is preferred over polygonal cross sections. Unit 10 is in effect hermetically sealed against the entry of air or loss of hydraulic liquid.

The unit 10 may be employed wherever a long travel kinetic energy dissipating cushioning action is desired; in addition to use in connection with a railroad car cushioned underframe, the device may be employed to cushion fifth wheel stands, as a dock buffer for the berthing of ships, as a safety buffer at the bottom of an elevator shaft, as a backstop at the end of an inclined conveyor track, and as a gun recoil absorber, to mention just a few.

While the unit 10 was designed to provide a cushioned travelling action on the order of thirty inches, the principles of the invention are just as applicable to short travel units.

The term "mandrel formed surface" as employed in the appended claims means surfaces on the order specified for surface 27 of tubular cylinder 12, which is to be distinguished from machined surfaces providing close tolerances.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A hydraulic cushioning device comprising a tubular cylinder member, a closure member affixed to one end of said cylinder member, means for effecting a static hydraulic seal between said closure member and said one end of said cylinder member, piston head means reciprocably mounted in said cylinder member for movement toward and away from said one end of said cylinder member, a tubular piston rod affixed to said piston head means, said piston rod extending away from said one end of said cylinder member and projecting outwardly of the other end of said cylinder member, said piston rod being of less transverse dimension than said piston head means, a closure member affixed adjacent to the end of said piston rod that is remote from said piston head means, means for effecting a static seal between the last mentioned closure member and said piston rod, a metering pin carried by the first mentioned closure member, said piston head means being formed with an orifice to receive said metering pin, said orifice and said metering pin being aligned with the bore of said piston rod, an annularly shaped member secured to said cylinder member with said piston rod extending therethrough, said annularly shaped member including an annular flange portion projecting toward said piston rod end, means for effecting a static seal between said cylinder member and said annularly shaped member, means for effecting a static seal between said annularly shaped member and said piston rod, the last mentioned means including a resiliently inflatable, flexible hydraulic liquid impervious tubular member received over said piston rod and having one of its ends sealingly clamped to said annularly shaped member flange portion and the other end thereof turned outside in and sealingly clamped to said piston rod, said piston rod being formed with spaced orifices directed transversely of said piston rod for connecting said piston rod bore with the space between said piston head means and said annularly shaped member, said annularly shaped member being formed to provide communication between the space enclosed by said inflatable member and said space between said piston head means and said annularly shaped member, with the space enclosed by said cylinder member, said closure members, said piston rod, and said static seals being fully charged with hydraulic liquid, said charge being under sufficient pressure to partially inflate said inflatable member to separate same from said piston rod except at said other end thereof, resilient means for biasing said piston head means away from said one end of said cylinder member, and stop means associated with said cylinder member and piston rod for limiting the amount of relative movement of said cylinder member with respect to said piston head means and piston rod under the action of said resilient means, said stop means being positioned with respect to said cylinder member and said piston rod such that said piston rod orifices are disposed between said piston head means and said annularly shaped member in the extended position of said device, said metering pin being formed to restrict hydraulic liquid flow through said piston head means orifice, on contraction of said device, such that said device has a substantially constant force-travel closure characteristic.

2. A hydraulic cushioning device comprising a tubular cylinder member, a closure member affixed to one end of said cylinder member, means for effecting a static hydraulic seal between said closure member and said one end of said cylinder member, piston head means reciprocably mounted in said cylinder member for movement toward and away from said one end of said cylinder member, a tubular piston rod affixed to said piston head means, said piston rod extending away from said one end of said cylinder member and projecting outwardly of the other end of said cylinder member, said piston rod being of less transverse dimension than said piston head means, a closure member affixed to the end of said piston rod that is remote from said piston head means, means for effecting a static seal between the last mentioned closure member and said end of said piston rod, with the internal surface of said cylinder member having a smoothness substantially equivalent to that of a mandrel formed surface, a metering pin carried by the first mentioned closure member, said piston head means being formed with an orifice to receive said metering pin, said orifice and said metering pin being aligned with the bore of said piston rod, a tubular annularly shaped member secured to said cylinder member with said piston rod extending therethrough in guiding contact therewith, with the exterior of said piston rod being unfinished to provide relatively rough tolerances between said annularly shaped member and said piston rod, said annularly shaped member including an annular flange portion projecting toward said piston rod end, means for effecting a static seal between said cylinder member and said annularly shaped member, means for effecting a static seal between said annularly shaped member and said piston rod, the last mentioned means including a resiliently inflatable flexible hydraulic liquid impervious tubular member received over said piston rod and having one of its ends sealingly clamped to said annularly shaped member flange portion and the other end thereof turned outside in and sealingly clamped to said piston rod exterior, said piston rod being formed with spaced orifices directed transversely of said piston rod for connecting said piston rod bore with the space between said piston head means and said annularly shaped member, said annularly shaped member being formed with spaced passages extending longitudinally of said cylinder member and connecting the space enclosed by said inflatable member with said space between said piston head means and said annularly shaped member, with the space enclosed by said cylinder member, said closure members, said piston rod, and said static seals being fully charged with hydraulic liquid, said charge being under sufficient pressure to partially inflate said inflatable member to separate same from said piston rod except at said other end thereof, with the sealing action between said internal surface of said cylinder member and said piston head means being effected at least in a substantial way by the viscosity of said hydraulic liquid, resilient means for biasing said piston head means away from said one end of said cylinder member, and stop means associated with said cylinder member and piston rod for limiting the amount of relative movement of said cylinder member with respect to said piston head means and piston rod under the action of said resilient means, said stop means being positioned with respect to said cylinder member and said piston rod such that said piston rod orifices are disposed between said piston head means and said annularly shaped member in the extended position of said device, said metering pin being formed to restrict hydraulic liquid flow through said piston head orifice, on contraction of said device, such that said device has a substantially constant force-travel closure characteristic.

3. The device set forth in claim 2 wherein said resilient means comprises compression spring means interposed between said one end of said cylinder member and said end of said piston rod, and including a tubular guide member interposed between said spring means and said cylinder member, the last mentioned tubular guide member being perforated and overlying the other end of said cylinder member and extending between same and said end of said piston rod.

References Cited in the file of this patent
UNITED STATES PATENTS

| | | |
|---|---|---|
| 2,231,332 | Griepenstroh | Feb. 11, 1941 |
| 2,597,270 | White et al. | May 20, 1952 |
| 2,766,673 | Elliott | Oct. 16, 1956 |

FOREIGN PATENTS

| | | |
|---|---|---|
| 1,153,671 | France | Oct. 14, 1957 |
| 1,153,849 | France | Oct. 14, 1957 |